(12) United States Patent
Wang et al.

(10) Patent No.: US 12,279,029 B2
(45) Date of Patent: Apr. 15, 2025

(54) FILTER ASSEMBLY AND IMAGING DEVICE

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 130 days.

(21) Appl. No.: 18/187,176

(22) Filed: Mar. 21, 2023

(65) Prior Publication Data

US 2024/0284023 A1 Aug. 22, 2024

(30) Foreign Application Priority Data

Feb. 22, 2023 (CN) .......................... 202320387174.2

(51) Int. Cl.
*H04N 23/55* (2023.01)
*G03B 17/12* (2021.01)
*G03B 17/14* (2021.01)
*G03B 17/56* (2021.01)
*H04N 23/51* (2023.01)
*H04N 23/53* (2023.01)

(52) U.S. Cl.
CPC .......... *H04N 23/531* (2023.01); *G03B 17/12* (2013.01); *G03B 17/14* (2013.01); *G03B 17/565* (2013.01); *G03B 17/566* (2013.01); *H04N 23/51* (2023.01); *H04N 23/55* (2023.01)

(58) Field of Classification Search
CPC ...... H04N 23/51; H04N 23/531; H04N 23/55; G03B 11/045; G03B 17/12; G03B 17/14; G03B 17/565; G03B 17/566; Y02E 40/40
See application file for complete search history.

(56) References Cited

U.S. PATENT DOCUMENTS

| | | | | |
|---|---|---|---|---|
| 2,953,970 A | * | 9/1960 | Maynard ................. | G02B 7/00 335/285 |
| 2012/0236424 A1 | * | 9/2012 | Yang ..................... | G03B 17/565 359/819 |
| 2012/0268648 A1 | * | 10/2012 | Yang ..................... | G02B 7/102 348/360 |
| 2021/0200069 A1 | * | 7/2021 | Enoch ................... | G03B 17/565 |
| 2021/0389544 A1 | * | 12/2021 | Cahall ................... | G03B 11/00 |

* cited by examiner

*Primary Examiner* — Lin Ye
*Assistant Examiner* — Chriss S Yoder, III
(74) *Attorney, Agent, or Firm* — Westbridge IP LLC

(57) ABSTRACT

Disclosed are a filter assembly and an imaging device. The filter assembly is applied to the imaging device, the imaging device includes a housing and a camera protruding on the housing. The filter assembly includes a filter and a mounting bracket, the mounting bracket is made of a magnetic material and can be magnetically absorbed on the housing, and the filter in mounted on the mounting bracket to cover a front side of the camera.

10 Claims, 6 Drawing Sheets

FILTER ASSEMBLY AND IMAGING DEVICE

CROSS-REFERENCE TO RELATED APPLICATIONS

This application claims priority to Chinese Patent Application No. 202320387174.2, filed on Feb. 22, 2023, the content of which is incorporated herein by reference in its entirety.

TECHNICAL FIELD

The present disclosure relates to the technical field of photographic equipment, and in particular to a filter assembly and an imaging device.

BACKGROUND

With the rapid development of electronic products, imaging devices such as mobile phones and cameras with shooting functions, are attracting more and more attention. The imaging devices form and record images by using the principle of optical imaging. During a shooting process of the imaging device to the object, the reflected light passes through the lens assembly of the imaging device and irradiates the photosensitive element, the photosensitive element generates a corresponding electrical signal, and the imaging device generates a corresponding image information.

In order to improve and adjust the light obtained by imaging device, additional lenses or additional filters are installed on portable imaging device such as mobile phones and cameras to obtain different shooting effects. At present, filters are usually installed on the imaging device by double-sided adhesive, which makes it time-consuming and laborious to disassemble and assemble the filter. Besides, after the filter is removed, glue marks will be left on the imaging device, which is easy to damage the surface of the device.

SUMMARY

The main objective of the present disclosure is to provide a filter assembly, aiming to improve the convenience to disassemble and assemble the filter, and avoid damaging the imaging device.

To achieve the above purpose, the present disclosure provides a filter assembly, which is applied to a imaging device, the imaging device includes a housing and a camera protruding on the housing, the filter assembly includes a filter and a mounting bracket, the mounting bracket is made of a magnetic material or a ferromagnetic material, the mounting bracket can be magnetically adsorbed on the housing, and the filter is mounted on the mounting bracket to cover a front side of the camera.

In an embodiment, the filter includes a lens frame and a lens, the lens frame is provided with a lens hole, the lens hole is sealed by the lens, and the lens frame is detachably installed on the mounting bracket.

In an embodiment, the lens frame is made of a magnetic material or a ferromagnetic material, and the lens frame is magnetically adsorbed to the mounting bracket.

In an embodiment, the mounting bracket is provided with an avoidance hole corresponding to the lens hole, and the lens frame is inserted into the mounting bracket.

In an embodiment, the lens frame is provided with a first guiding portion and a second guiding portion in sequence along an axial direction of the lens hole, an outer diameter of the first guiding portion is greater than an outer diameter of the second guiding portion; and the avoidance hole is provided with a first hole section and a second hole section in sequence along an axial direction of the avoidance hole, a diameter of the first hole section is greater than a diameter of the second hole section, the second guiding portion is inserted into the first hole section, and the second guiding portion is fitted with and abutted against an opposite side of the first hole section.

In an embodiment, the lens is fixed on a side of the lens frame away from the mounting bracket to form a cavity between the lens and the camera.

In an embodiment, the mounting bracket includes a main body portion and a reinforcement portion, a side of the main body portion is connected to the filter, the reinforcement portion is located at a side of the main body portion away from the filter and the reinforcement portion is bent relative to the main body portion.

In an embodiment, the filter assembly further includes a buffer fixedly provided on a side of the mounting bracket away from the filter.

In an embodiment, a mounting groove is provided on the side of the mounting bracket away from the filter, the buffer is provided in the mounting groove, and at least a part of the buffer protrudes from a surface of the mounting bracket.

In an embodiment, the mounting bracket includes a first fixing portion and a second fixing portion rotatably connected to the first fixing portion; and the filter is mounted on the second fixing portion, when the first fixing portion is magnetically absorbed on the housing, the second fixing portion can be rotated to determine whether the front side of the camera is covered by the filter.

In an embodiment, the filter assembly further includes: a soft material layer fixed on a plane of the second fixing portion, and the plane is fitted with the housing.

The present disclosure also provides an imaging device, including: a housing; a camera; and the filter assembly, the camera is arranged on the housing, the mounting bracket is adsorbed on the housing, and the filter covers a front side of the camera.

In the present disclosure, the mounting bracket is made of a magnetic material, the filter is arranged on the mounting bracket. When the mounting bracket gets close to the imaging device, a magnetic attraction is activated between the mounting bracket and the housing, so that the filter assembly is fixed on the housing. In this way, the light filtered by the filter can be captured by the camera, and after the shooting task is completed, or other light needs to be filtered, it only takes an external force to overcome the magnetic attraction between the mounting bracket and the housing to remove the filter assembly. The assembling and the disassembling of the filter assembly can be realized without causing damage to the surface of the housing, which extends the life of the housing.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the prior art. Obviously, the drawings in the following description are only part of embodiments of the present disclosure. For those of ordinary skill in the art, other drawings can also be obtained according to the structures shown in these drawings without any creative effort.

Figure 1:
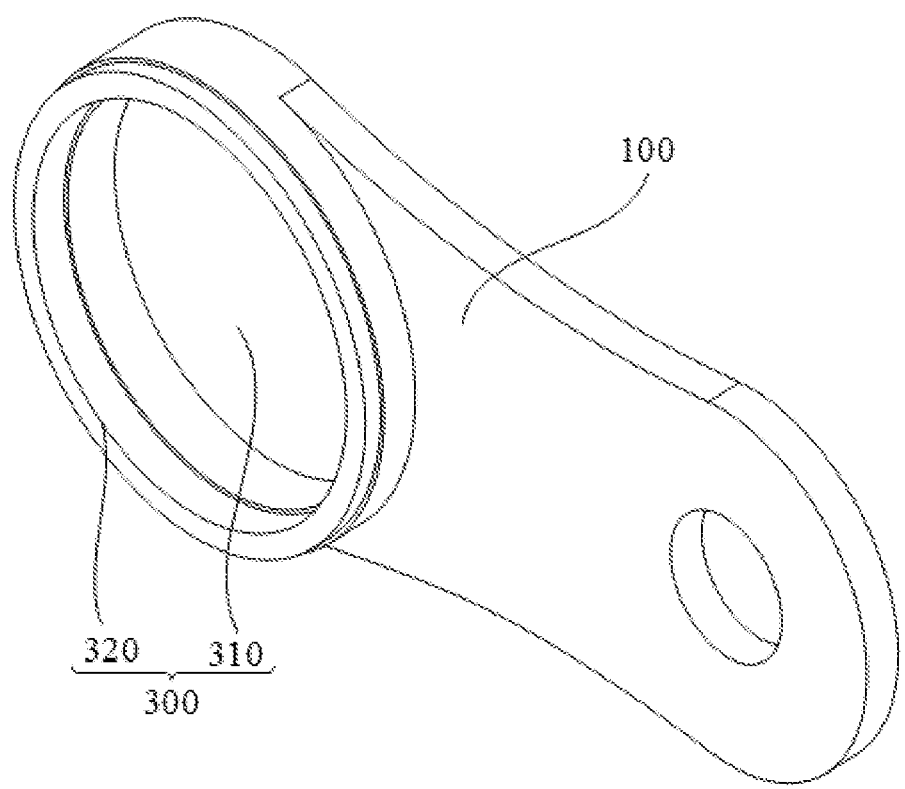
FIG. 1 is a schematic structural view of a filter assembly according to an embodiment of the present disclosure.
Figure 2:
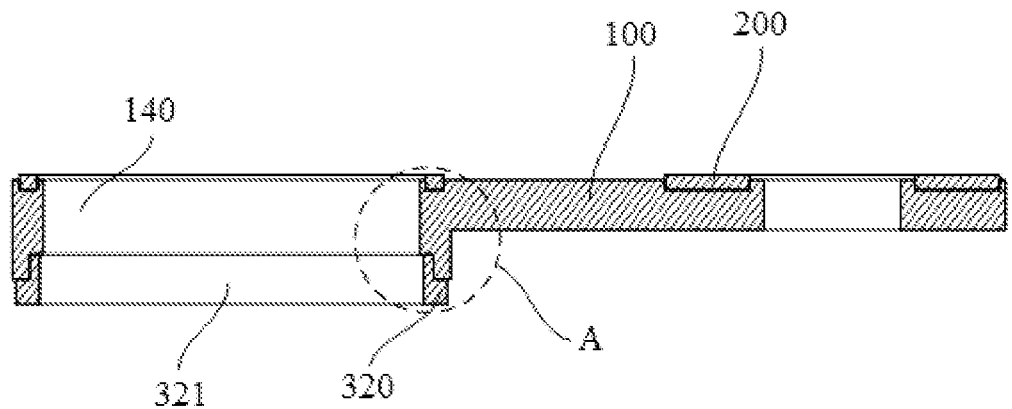
FIG. 2 is a sectional view of the filter assembly in FIG. 1.
Figure 3:
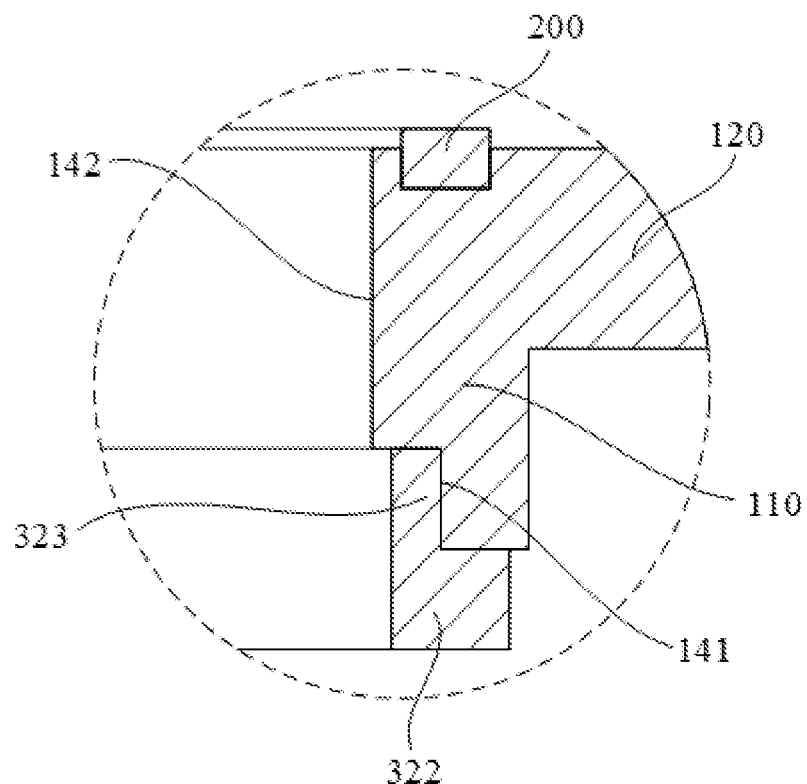
FIG. 3 is an enlarged view at portion A in FIG. 2.
Figure 4:
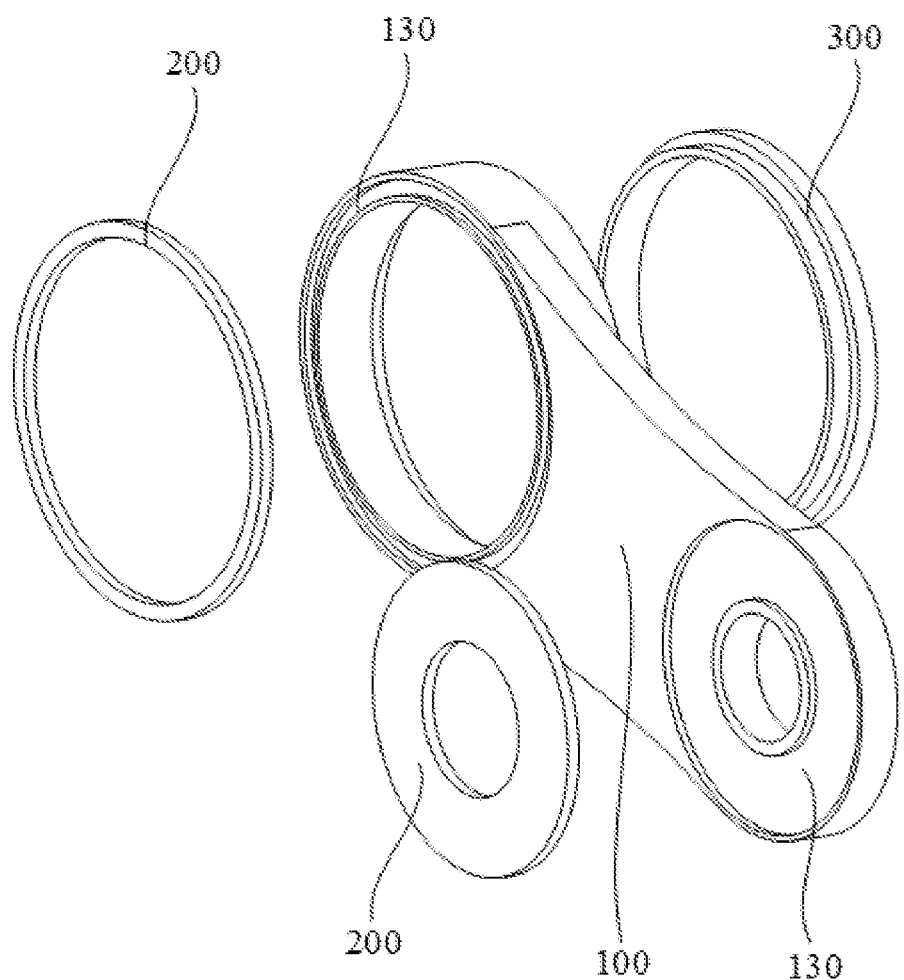
FIG. 4 is an explosive view of a filter assembly according to an embodiment of the present disclosure.
Figure 5:
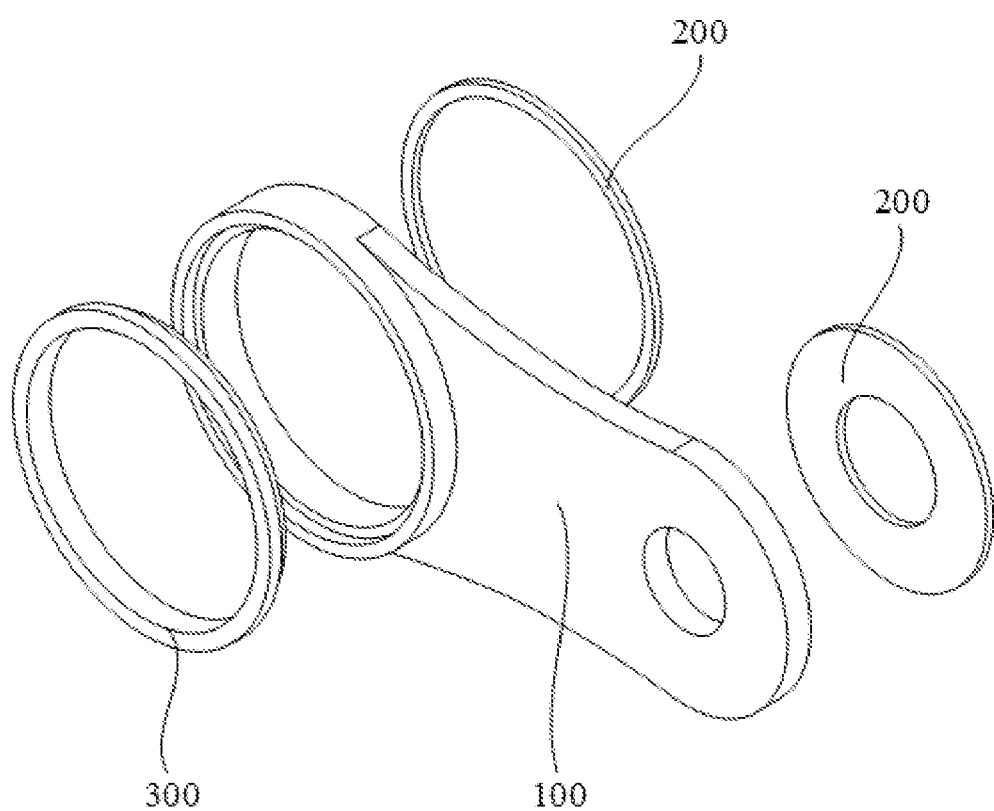
FIG. 5 is an explosive view from another perspective of a filter assembly according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there are directional indications, such as up, down, left, right, front, back, etc., involved in the embodiments of the present disclosure, the directional indications are only used to explain a certain posture as shown in the accompanying drawings. If the specific posture changes, the directional indication also changes accordingly.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the present disclosure includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of the present disclosure.

Most of housings of electronic products are made of metal materials, especially ferromagnetic materials, and even some electronic products include magnets. In this way, the housings of the electronic products are easy to attract ferromagnetic auxiliary tools or magnetic auxiliary tools having an opposite polarity with the electronic products.

The present disclosure provides a filter assembly.

In an embodiment, referring to FIG. 1 to FIG. 6, the filer assembly is applied to an imaging device, the imaging device includes a housing and a camera, and the camera protrudes from the housing. The filter assembly includes a filter 300 and a mounting bracket 100. The mounting bracket 100 is made of a magnetic material, and can be adsorbed on the housing by a magnetic attraction, the filter 300 is arranged on the mounting bracket 100 to cover a front side of the camera.

The mounting bracket 100 is made of a magnetic material, the filter 300 is arranged on the mounting bracket 100. When the mounting bracket 100 gets close to the imaging device, a magnetic attraction is activated between the mounting bracket 100 and the housing, so that the filter assembly is fixed on the housing. In this way, the light filtered by the filter 300 can be captured by the camera, and after the shooting task is completed, or other light needs to be filtered, it only takes an external force to overcome the magnetic attraction between the mounting bracket 100 and the housing to remove the filter assembly. The assembling and the disassembling of the filter assembly can be realized without causing damage to the surface of the housing, which extends the life of the housing.

The material of the housing can be a magnet, and the material of the mounting bracket 100 can be a ferromagnetic material or a magnet having an opposite magnetic polarity to housing. Similarly, the material of the housing can be the ferromagnetic material, and the material of the mounting bracket 100 can be the magnet, that is, a magnetic reaction of mutual attraction can be activated between the mounting bracket 100 and the housing. In addition, the imaging device may be a video recorder, a camera or a mobile phone. In an embodiment, the imaging device is the mobile phone.

Figure 6:
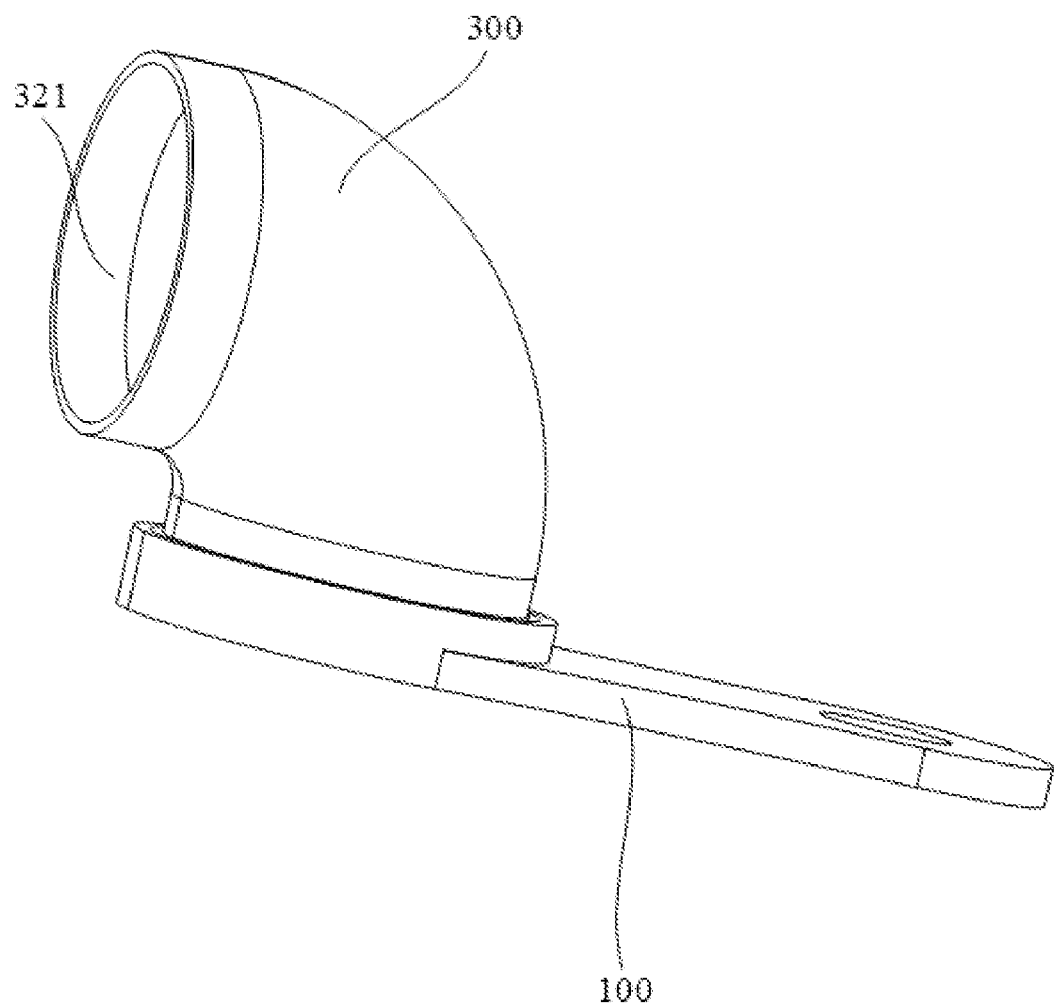
FIG. 6 is a schematic structural view of a filter assembly according to another embodiment of the present disclosure.

In an embodiment, the mounting bracket 100 covers a camera, and the filter 300 can directly correspond to the camera through the magnetic attraction, that is, a plane where the lens 310 is located is parallel to a plane where the camera is located. In an embodiment, as shown in FIG. 6, a reversing device may also be provided in the mounting bracket 100 so that an angel can be formed between the plane where the lens 310 is located and the plane where the camera is located. In an embodiment, a part on the mounting bracket 100 for installing the filter 300 is designed to be a shape of an elbow pipe. In some occasions where a light is uneven, the bent opening can be made towards a direction of the light to ensure sufficient lights passing through the filter 300. The reversing device is arranged at a bent part of the mounting bracket 100, an incident end of the reversing device is aligned with the lens 310, and an output end of the reversing device is aligned with the camera. In an embodiment, the lens frame 320 is designed to be curved, the mounting bracket 100 remains flat, and the reversing device is arranged at the bent part of the lens frame 320. Since the filter 300 is magnetically connected to the mounting bracket 100, the filter 300 can be rotatably adjusted with a center line of the first hole section 141 or the second hole section 142 as a rotation axis, thereby changing a direction of the lens hole 321, making the lens hole 321 towards a position with a best light, or toward a position with a desired light intensity.

It is necessary to ensure that a space between the filter 300 and the camera in the mounting bracket 100 is a sealed cavity, at this time, the camera can only capture the light filtered by the filter 300.

In an embodiment, referring to FIG. 1 to FIG. 5, the filter 300 includes a lens frame 320 and a lens 310, the lens frame 320 is provided with a lens hole 321 sealed by the lens 310, and the lens frame 320 is detachably installed on the mounting bracket 100. It can be understood that when the filter assembly is installed on the housing, the lens hole 321 is set corresponding to the camera, so that when it is necessary to filter other lights, it only needs to remove the lens frame 320 from the mounting bracket 100, and install the lens 310 with other filtering function, thereby avoiding to disassembly the entire filter assembly, ensuring that the mounting bracket 100 can be stably installed on the housing, and reducing a frequency of adjusting a position of the mounting bracket 100 and the camera. At the same time, when producing the filter 300 capable of filtering different lights, only the lens 310 and the lens frame 320 need to be produced, which reduces a production cost of each filter assembly. In an embodiment, the filter 300 may be non-detachably fixed on the mounting bracket 100.

In an embodiment, referring to FIG. 1 to FIG. 5, the lens frame 320 is made of the magnetic material, and the lens frame 320 is magnetically connected to the mounting bracket 100, or the lens frame 320 is made of the ferromagnetic material when the mounting bracket is made of the magnetic material. It should be noted that, on a premise that there is a magnetic attraction between the lens frame 320 and the mounting bracket 100, the lens frame 320 can be made of the ferromagnetic material, the mounting bracket 100 can be made of the magnet, or the lens frame 320 can be made of the magnet, the mounting bracket 100 can be made of the ferromagnetic material, or the lens frame 320 and the mounting bracket 100 are made of magnets with different polarities. In this way, when the filter 300 needs to be replaced, an external force is needed to overcome the magnetic attraction between the lens frame 320 and the mounting bracket 100, then the filter 300 can be detached from the mounting bracket 100, and a new filter 300 can be installed on the mounting bracket 100 through the magnetic attraction, thereby facilitating a replacement of the filter 300. In an embodiment, the detachable connection between the lens frame 320 and the mounting bracket 100 can be a screw connection or a snap connection.

In an embodiment, referring to FIG. 1 to FIG. 5, the mounting bracket 100 is provided with an avoidance hole 140 corresponding to the lens hole 321, the lens frame 320 is inserted into the mounting bracket 100 or the mounting bracket 100 is inserted into the lens frame 320. It should be noted that the lens hole 321 is corresponding to the avoidance hole 140, that is, when the filter 300 is mounted on the mounting bracket 100, the lens hole 321 and the avoidance hole 140 are aligned or at least partially overlapped. In an embodiment, a central axis of the lens hole 321 is overlapped with a central axis of the avoidance hole 140. It can be understood that the lens 310 is directly opposite to the camera, the avoidance hole 140 and the lens hole 321 are arranged between the lens 310 and the camera. At the same time, a wall of the avoidance hole 140 is partly overlapped with a wall of the lens hole 321 and a dislocation is formed, which can prevent other lights entering a gap between the lens hole 321 and the avoidance hole 140 from a gap of an interface between the lens frame 320 and the mounting bracket 100 and causing an interference to the filtering of the lens 310, thereby ensuring that only the light passing through the lens 310 can be captured by the camera to achieve the filtering function. In addition, under a condition that the lens can cover the camera, a shape of the lens hole 321 and the avoidance hole 140 can be rectangle, prism or circle.

In an embodiment, referring to FIG. 1 to FIG. 5, in an axial direction of the lens hole 321, the lens frame 320 is provided with a first guiding portion 322 and a second guiding portion 323 in sequence, and an outer diameter of the first guiding portion 322 is greater than an outer diameter of the second guiding portion 323. The avoidance hole 140 is provided with a first hole section 141 and a second hole section 142 in sequence along an axial direction of the avoidance hole 140, and a diameter of the first hole section 141 is greater than a diameter of the second hole section 142, the second guiding portion 323 is inserted into the first hole section 141, and the second guiding portion 323 is abutted against an opposite side of the first hole section 141. It can be understood that the first guiding portion 322, the second guiding portion 323, the first hole section 141 and the second hole section 142 are arranged in sequence, and the second guiding portion 323 is inserted into the first hole section 141, so that an outer wall of the lens hole 321 is relatively abutted against a wall of the avoidance hole 140 to form a stepped plane, which can block a passage of lights, so that the light cannot enter the lens hole 321 and the avoidance hole 140 from the interface of the lens frame 320 and the mounting bracket 100. In this way, the lights will not interfere with the filtering of the lens 310, so as to prevent the light filtered by the lens 310 from being interfered by other lights before being captured by the camera, and affecting the imaging effect of the camera. In an embodiment, a third hole section and a fourth hole section may also be provided in sequence in the axial direction of the lens hole 321, a diameter of the third hole section is smaller than a diameter of the fourth hole section, and the mounting bracket 100 may also be a third guiding portion and a fourth guiding portion corresponding to the outer wall of the avoidance hole 140, and an outer diameter of the third guiding portion is smaller than an outer diameter of the fourth guiding portion. The third hole section, the fourth hole section, the third guiding portion and the fourth guiding portion are arranged in sequence, the third guiding portion is inserted into the fourth hole section, and the third guiding portion is abutted against an opposite side of the fourth hole section.

The first guiding portion 322 and the second guiding portion 323 can be made of magnetic materials, or only the first guiding portion 322 is made of the magnetic material, or only the second guiding portion is made of the magnetic material, so as to ensure that the lens frame 320 can be magnetically connected to the mounting bracket 100.

In an embodiment, referring to FIG. 1 to FIG. 5, the lens 310 is fixed on a side of the lens frame 320 away from the mounting bracket 100, so that a cavity is formed between the lens 310 and the camera. In this way, after covering the camera with the filter assembly, it is possible to prevent the lens 310 from being scratched due to being abutted against the camera, and ensure the filtering effect of the lens 310 and the imaging effect of the camera. In an embodiment, a limiting structure can be provided in the avoidance hole 140 in the mounting bracket 100, so that after the camera is covered by the mounting bracket 100, the lens 310 is separated from the camera by the limiting structure.

In an embodiment, referring to FIG. 1 to FIG. 5, the mounting bracket 100 includes a main body portion 110 and a reinforcement portion 120, one side of the body portion 110 is connected to the filter 300, and the reinforcement portion 120 is located on a side of the body portion 110 away from the filter 300, and is bent relative to the main body portion 110. It can be understood that, in an embodiment, the interface of the housing and the mounting bracket 100 is a plane, and the main body portion is on a same plane with the side of the reinforcement portion 120 facing the housing, so as to improve the stability of the connection between the mounting bracket 100 and the housing. In this way, a reinforcing member can increase a connecting area between the mounting bracket 100 and the housing, thereby improving the magnetic attraction between the mounting bracket 100 and the housing, that is, improving the stability of the connection between the mounting bracket 100 and the housing. The reinforcing portion 120 may be extended from only one side of the main body portion 110, or may be extended around an outer peripheral side of the avoidance hole 140.

In an embodiment, referring to FIG. 1 to FIG. 5, the filter assembly also includes a buffer 200 fixed on the side of the mounting bracket 100 away from the filter 300, so that the buffer 200 is fitted to the side of the imaging device with the camera. It should be noted that, when the mounting bracket 100 and the housing are made of magnetic materials, a direct connection between which is easily damaged. In addition, the buffer 200 can cover the opposite surface of the mounting bracket 100 and the housing, or can be arranged in a circle around a circumference of the avoidance hole 140, and can also be distributed at multiple intervals on the opposite surface of the mounting bracket 100 and the housing. In this way, when the filter assembly is installed on the housing, the buffer 200 arranged on the gap between the mounting bracket 100 and the imaging device can avoid a direct hard collision between the mounting bracket 100 and the housing, scratching the housing, and affecting an overall appearance. In an embodiment, the buffer 200 may pass through the mounting bracket 100, and a part of the buffer 200 protrudes on the side of the mounting bracket 100 facing the housing.

In an embodiment, referring to FIG. 1 to FIG. 5, the side of the mounting bracket 100 away from the filter 300 is provided with a mounting groove 130, the buffer 200 is arranged in the mounting groove 130, and at least part of the buffer 200 protrudes the surface of the mounting bracket 100. It should be noted that, in an embodiment, the buffer 200 is fixed in the mounting groove 130 by gluing, and the buffer 200 is made of foam, cotton or soft plastic. In this way, the mounting groove 130 can prevent the buffer 200 from falling off the mounting bracket 100, so as to improve the connection stability between the mounting bracket 100 and the buffer 200. At the same time, a part of the buffer 200 protrudes the side of the mounting bracket 100 facing towards the housing. When the mounting bracket 100 is installed on the housing, the buffer 200 can prevent the mounting bracket 100 from directly colliding with the housing and scratching the housing.

Figure 7:
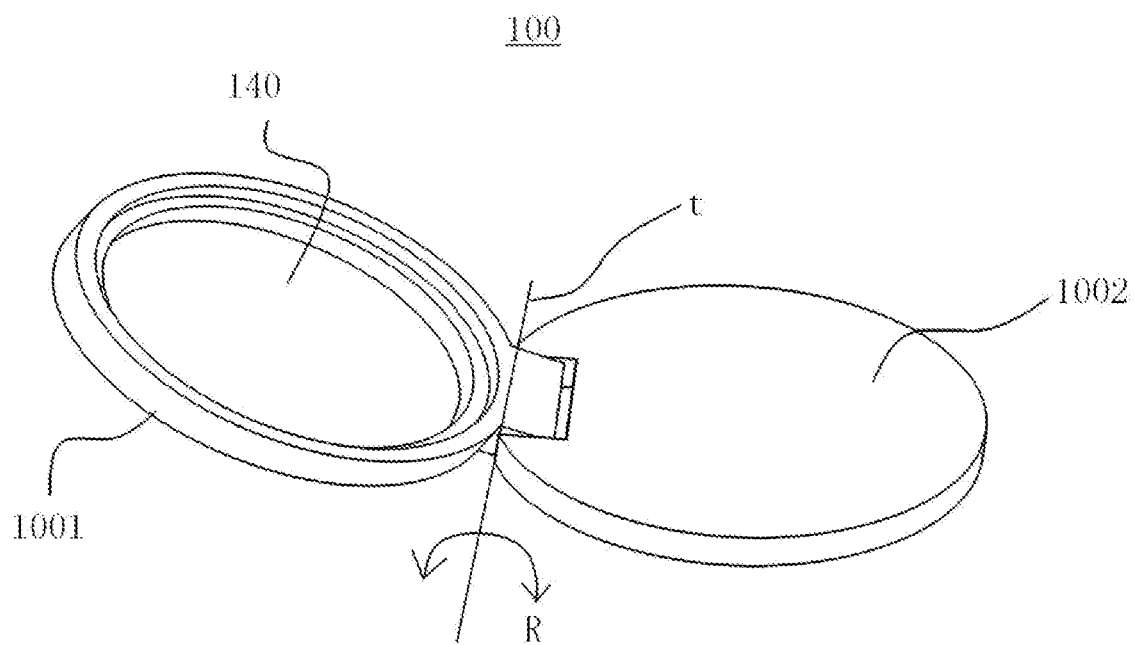
FIG. 7 is a schematic structural view of a mounting bracket according to an embodiment of the present disclosure.

Referring to FIG. 7, in an embodiment, the mounting bracket includes a first fixing portion 1002 and a second fixing portion 1001 rotatably connected to the first fixing portion 1002. In an embodiment, an inner groove can be provided on an edge of the first fixing portion 1002, and an outer boss fitted with the inner groove is arranged on the second fixing portion 1001. After the inner groove of the first fixing portion 1002 is mated with the outer boss of the second fixing portion 1001, the first fixing portion 1002 and the second fixing portion 1001 are connected through the rotating shaft passing through the inner groove and the outer boss in sequence, so as to realize a rotational connection of the second fixing portion 1001. Referring to FIG. 7, the second fixing portion 1001 can rotate around a rotation axis t along a R direction. When in use, the filter 300 is mounted on the second fixing portion 1001, when the first fixing portion 1002 is magnetically attracted to the housing, the second fixing portion 1001 can be rotated to cover the front side of the camera through the filter 300 or not. When the second fixing portion 1001 rotates toward the camera until a plane F of the second fixing portion 1001 is contacted with the housing, since the second fixing portion 1001 is made of the magnetic material or the ferromagnetic material, after the second fixing portion 1001 is in contact with the housing, the second fixing portion 1001 is also magnetically attracted to the housing to play a fixing role. The filter 300 on the second fixing portion 1001 covers the front side of the camera, and can filter the light when shooting. When photographing in a natural state is adopted without filter photography, an appropriate force can be applied to overcome the magnetic attraction force of the housing to the second fixing portion 1001 and rotate around the rotation axis t away from the camera. For example, the second fixing portion 1001 can be rotated to a limiting position which is overlapped with the first fixing portion 1002 as close as possible, or the second fixing portion 1001 can be manually supported to make it temporarily away from the front side of the camera. Since the filter is far away from the front side of the camera, the filter on the second fixing portion 1001 does not cover the front side of the camera.

Figure 8:
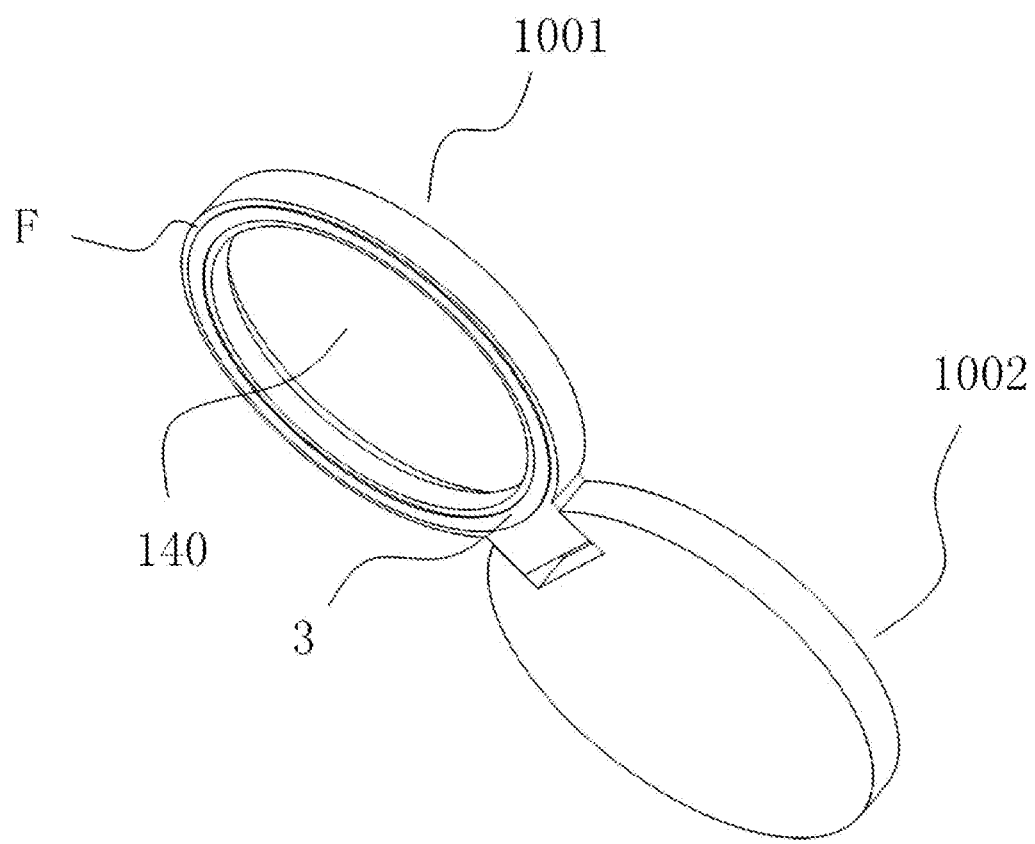
FIG. 8 is a schematic structural view of a mounting bracket according to another embodiment of the present disclosure.

In an embodiment, the mounting bracket further includes a soft material layer 3. Referring to FIG. 8, the soft material layer 3 is fixed on a plane F of the second fixing portion which can be fitted with the housing. When the second fixing portion 1001 rotates toward the camera until the plane F of the second fixing portion 1001 is contacted with the housing, since the second fixing portion 1001 is also magnetic, after the second fixing portion 1001 is contacted with the housing, the second fixing portion 1001 is also magnetically adsorbed on the housing to play a fixed role. At this time, since the plane F of the second fixing portion 1001 is also provided with a soft material layer 3, the soft material layer 3 is under the magnetic attraction force to be squeezed and deformed, so as to play the role of sealing, preventing the light entering the cavity from a gap between the plane F of the second fixing portion 1001 and a contacting surface with the housing, so that the filtering effect is more reliable. The soft material layer can be a cotton or a foam layer.

It should be noted that, in an embodiment, referring to FIG. 7 and FIG. 8, the filter can be non-detachably fixed on the second fixing portion 1001, or can be detachably fixed on the second fixing portion 1001. When the filter is detachably fixed on the second fixing portion 1001, the filter includes the lens frame 320 and the lens 310, the lens frame 320 is provided with the lens hole 321, and the lens hold 321 is sealed by the lens 310, the lens frame 320 is detachably mounted on the second fixing portion 1001, the lens frame 320 may be made of the magnetic material, the lens frame 320 is detachably connected to the second fixing portion 1001 of the mounting bracket, the second fixing portion 1001 is provided with the avoidance hole 140 directly opposite to the lens hole 132, the lens frame 320 is inserted into the second fixing portion 1001, or the second fixing portion 1001 is inserted into the lens frame 320. In an embodiment, the lens frame 320 is provided with the first guiding portion 322 and the second guiding portion 323 in sequence along the axial direction of the lens hole 321, and the outer diameter of the first guiding portion 322 is larger than that of the second guiding portion. In the axial direction of the avoidance hole 140, the avoidance hole 140 is provided with the first hole section 141 and the second hole section 142 in sequence, and the diameter of the first hole section 141 is larger than that of the second hole section 142. The second guiding portion 323 is inserted into the first hole section 142, and the second guiding portion 323 is adapted to be abutted against the opposite side of the first hole section 141. In an embodiment, the lens 310 is fixed on the side of the lens frame 320 away from the second fixing portion 1001, so that the cavity is formed between the lens 310 and the camera.

The present disclosure also provides an imaging device, including a housing, a camera and a filter assembly, a part of the camera is exposed outside the housing, and the mounting bracket 100 is adsorbed on the housing so that the filter covers a front side of the camera. In this way, the light adjusted by the filter 300 can be captured by the camera, so that the imaging device can form a good shooting effect.

The specific structure of the filter assembly is recorded in the above-mentioned embodiments. Since the imaging device adopts all the technical solutions of all the above-mentioned embodiments, it has at least all the beneficial effects brought by the technical solutions of the above-mentioned embodiments, and will not be described here one by one.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields are included in the scope of the present disclosure.

What is claimed is:

1. A filter assembly, applied to an imaging device, the imaging device comprising a housing and a camera protruding from the housing, wherein the filter assembly comprises a filter and a mounting bracket, the mounting bracket is made of a magnetic material or a ferromagnetic material, the mounting bracket is configured to be magnetically adsorbed on the housing, and the filter is mounted on the mounting bracket to cover a front side of the camera;

wherein the mounting bracket comprises a main body portion and a reinforcement portion, a side of the main body portion is connected to the filter, the reinforcement portion is located at a side of the main body portion away from the filter and the reinforcement portion is bent relative to the main body portion; and the filter assembly further comprises: a buffer fixedly provided on a side of the mounting bracket away from the filter.

2. The filter assembly of claim 1, wherein the filter comprises a lens frame and a lens, the lens frame is provided with a lens hole, the lens hole is sealed by the lens, and the lens frame is detachably installed on the mounting bracket.

3. The filter assembly of claim 2, wherein the lens frame is made of a magnetic material or a ferromagnetic material, and the lens frame is magnetically adsorbed to the mounting bracket.

4. The filter assembly of claim 2, wherein the mounting bracket is provided with an avoidance hole corresponding to the lens hole, and the lens frame is inserted into the mounting bracket.

5. The filter assembly of claim 4, wherein:

the lens frame is provided with a first guiding portion and a second guiding portion in sequence along an axial direction of the lens hole, an outer diameter of the first guiding portion is greater than an outer diameter of the second guiding portion; and the avoidance hole is provided with a first hole section and a second hole section in sequence along an axial direction of the avoidance hole, a diameter of the first hole section is greater than a diameter of the second hole section, the second guiding portion is inserted into the first hole section, and the second guiding portion is fitted with and abutted against an opposite side of the first hole section.

6. The filter assembly of claim 2, wherein the lens is fixed on a side of the lens frame away from the mounting bracket to form a cavity between the lens and the camera.

7. The filter assembly of claim 1, wherein a mounting groove is provided on the side of the mounting bracket away from the filter, the buffer is provided in the mounting groove, and at least a part of the buffer protrudes from a surface of the mounting bracket.

8. The filter assembly of claim 1, wherein:

the mounting bracket comprises a first fixing portion and a second fixing portion rotatably connected to the first fixing portion; and the filter is mounted on the second fixing portion, when the first fixing portion is magnetically absorbed on the housing, the second fixing portion is configured to be rotated to determine whether the front side of the camera is covered by the filter.

9. The filter assembly of claim 8, further comprising:

a soft material layer fixed on a plane of the second fixing portion, wherein the plane is fitted with the housing.

10. An imaging device, comprising:

a housing;

a camera; and the filter assembly of claim 1, wherein the camera is arranged on the housing, the mounting bracket is adsorbed on the housing, and the filter covers a front side of the camera.

* * * * *